United States Patent
Chou

(10) Patent No.: US 8,797,446 B2
(45) Date of Patent: Aug. 5, 2014

(54) OPTICAL IMAGING DEVICE

(75) Inventor: Chia-Te Chou, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 99 days.

(21) Appl. No.: 13/340,681

(22) Filed: Dec. 30, 2011

(65) Prior Publication Data
US 2012/0224093 A1    Sep. 6, 2012

(30) Foreign Application Priority Data

Mar. 3, 2011    (TW) .............................. 100107103 A

(51) Int. Cl.
*H04N 5/225*    (2006.01)

(52) U.S. Cl.
USPC ............ 348/340; 348/335; 345/173; 345/175

(58) Field of Classification Search
CPC .............................. G06F 3/0428; G06F 3/0421
USPC ............................ 348/335, 340; 345/173, 175
See application file for complete search history.

(56) References Cited

U.S. PATENT DOCUMENTS

| | | | |
|---|---|---|---|
| 6,570,103 B1* | 5/2003 | Saka et al. ................. | 178/18.01 |
| 2007/0033539 A1* | 2/2007 | Thielman et al. ............. | 715/769 |
| 2009/0267919 A1 | 10/2009 | Chao | |
| 2010/0312625 A1* | 12/2010 | Miller et al. ................. | 705/14.5 |
| 2011/0063256 A1* | 3/2011 | Ye et al. ........................ | 345/175 |
| 2011/0199335 A1* | 8/2011 | Li et al. ......................... | 345/175 |
| 2011/0291988 A1* | 12/2011 | Bamji et al. .................. | 345/175 |

FOREIGN PATENT DOCUMENTS

| | | |
|---|---|---|
| CN | 101261557 A | 9/2008 |
| CN | 101667083 A | 3/2010 |
| TW | M338402 | 8/2008 |
| TW | 200945123 | 11/2009 |
| TW | 201037579 | 10/2010 |

OTHER PUBLICATIONS

Office action mailed on Mar. 10, 2014 for the Taiwan application No. 100107103, filing date: Mar. 3, 2011, p. 1 line 14, p. 2-3 and p. 4 line 1-6.

Office action mailed on May 26, 2014 for the China application No. 201110060299.6, p. 3 line 4-45, p. 4 -5 and p. 6 line 1-5 Translation.

* cited by examiner

*Primary Examiner* — Antoinette Spinks

(74) *Attorney, Agent, or Firm* — Winston Hsu; Scott Margo

(57) ABSTRACT

An optical imaging device includes a display panel whereon a coordinate detecting area is formed, at least one first reflective optical unit installed on an outside corner of the display panel for reflecting light transmitted from an object moving within the coordinate detecting area, at least one second reflective optical unit installed outside the display panel for reflecting the light reflected from the at least one first reflective optical unit, an image capturing module for capturing the light reflected from the at least one second reflective optical unit so as to capture image of the object, and a control module coupled to the image capturing module for receiving the image captured by the image capturing module and for calculating a coordinate value of the object within the coordinate area according to the image.

13 Claims, 6 Drawing Sheets

OPTICAL IMAGING DEVICE

BACKGROUND OF THE INVENTION

1. Field of the Invention

The present invention relates to an optical imaging device, and more particularly, to an optical imaging device with a plurality of reflective optical units for capturing image simultaneously by a single image capturing module.

2. Description of the Prior Art

In the modern consumer electronic products market, a portable electronic product such as a personal digital assistant, a smart phone or a mobile phone is equipped with a touch control device as an interface for data transmission. Since consumer electronic products have become lighter, thinner, shorter, and smaller, there is no space on these products for containing a conventional input device, such as a mouse, a keyboard and so on. Furthermore, with development of tablet computers focusing on humanity design, a display with the touch control device has gradually become one of the key components in various electronic products. However, as technology advances, a variety of touch control technologies such as a resistive type, a capacitive type, an ultrasonic type, an infrared type, an optical masking type, an optical imaging type and so on have been developing. Since technology level and cost diverge, the above-mentioned touch control technologies have been implemented in various fields. For example, principle of the optical imaging design is to utilize two image capturing modules located at two corners of the display for detecting a location of an object on the display. Then, the location of the object on the display is calculated by coordinate transformation. Thus, compared with the conventional resistive type or capacitive type touch device, it not only has advantages of high accuracy, good stability, low damage rate and being capable of multi-touch, but also has advantage of low cost. Especially, the optical imaging design is overwhelmingly advantageous in the large-size display market. However, the conventional optical imaging device not only requires more than two image capturing modules so as to detect a shadow formed by the object, but also has an issue of synchronization of capturing images by the two image capturing modules. Consequently, it results in enhancement of cost. In order to solve above drawbacks, Taiwan Patent No. M338402 discloses a display with reflective mirrors disposed on a bottom-left and a bottom-right corners within a touch control area, so as to reflect the image of the object to a single image sensor. However, when the display is in large size, it needs the image sensor with a larger sensing area and will cause an issue of image deformation. For solving the above drawbacks, the image capturing module needs to calibrate the deformed image in particular. Furthermore, since the disposal positions of the reflective mirrors are within the touch control area, it is not convenient for a user to use the computer. As a result, design of an optical imaging device for reducing cost and being capable of solving the problem of synchronization of capturing images is an important issue of the touch technique.

SUMMARY OF THE INVENTION

The present invention provides an optical imaging device with a plurality of reflective optical units for capturing image synchronously by a single image capturing module for solving above drawbacks.

According to the claimed invention, an optical imaging device includes a display panel whereon a coordinate detecting area is formed, at least one first reflective optical unit installed on an outside corner of the display panel for reflecting light transmitted from an object moving within the coordinate detecting area, at least one second reflective optical unit installed outside the display panel for reflecting the light reflected from the at least one first reflective optical unit, an image capturing module installed on a side of the display panel for capturing the light reflected from the at least one second reflective optical unit so as to capture at least one image of the object, and a control module coupled to the image capturing module for receiving the at least one image captured by the image capturing module and for calculating a coordinate value of the object within the coordinate area according to the at least one image.

According to the claimed invention, the at least one first reflective optical unit comprises two first reflective optical units respectively installed on two corners of an outer side of the display panel.

According to the claimed invention, the at least one second reflective optical unit comprises two second reflective optical units installed at a middle position of the outer side of the display panel for respectively reflecting the light reflected from the two first reflective optical units.

According to the claimed invention, a gap is formed between the two second reflective optical units.

According to the claimed invention, the second reflective optical unit is a prism, and two sides of the prism are used for respectively reflecting the light reflected from the two first reflective optical units.

According to the claimed invention, the optical imaging device further includes at least one third reflective optical unit disposed on a light path between the at least one second reflective optical unit and the image capturing module, the at least one third reflective optical unit being used for reflecting the light reflected from the at least one second reflective optical unit or for reflecting the light transmitted from the object to the image capturing module.

According to the claimed invention, the at least one third reflective optical unit includes two third reflective optical units, and one of the two third reflective optical units is used for reflecting the light reflected from the at least one second reflective optical unit or for reflecting the light transmitted from the object to the other one third reflective optical unit, so as to make the other one third reflective optical unit reflect the light to the image capturing module.

According to the claimed invention, the at least one first reflective optical unit, the at least one second reflective optical unit, and the at least one third reflective optical unit are disposed above the display panel, and the image capturing module is disposed behind the display panel.

According to the claimed invention, the optical imaging device further includes at least one light source disposed on the outside corner of the display panel for emitting light to the coordinate detecting area, so as to illuminate the object.

According to the claimed invention, the at least one light source is an infrared light emitting diode.

According to the claimed invention, the optical image device further includes a non-reflective rim disposed on lateral sides of the display panel for providing the object with an image capturing background.

According to the claimed invention, a width of the non-reflective rim is substantially equal to a width of the at least one first reflective optical unit and a width of the second reflective optical unit.

According to the claimed invention, the at least one first reflective optical unit and the at least one second reflective optical unit are respectively a planar reflective mirror or a spherical reflective mirror.

According to the claimed invention, the image capturing module is an image sensor.

In summary, the optical imaging device utilizes a plurality of reflective optical units to capture image synchronously by a single image capturing module, so as to save cost and solve an issue of synchronization of capturing images. Furthermore, the present invention utilizes the plurality of reflective optical units to focus the light reflected from the object on a position where the image is captured. Consequently, it can be implemented in large-size display panel neither utilizing an image sensor with a large sensing area nor causing an image to deform. Furthermore, since none of the reflective opticals is disposed within a touch control area of the display panel, it will not cause any inconvenience for a user. The present invention provides the optical imaging device with a low cost, high stability and being capable of solving the issue of synchronization of capturing images.

These and other objectives of the present invention will no doubt become obvious to those of ordinary skill in the art after reading the following detailed description of the embodiment that is illustrated in the various figures and drawings.

DETAILED DESCRIPTION

Figure 1:
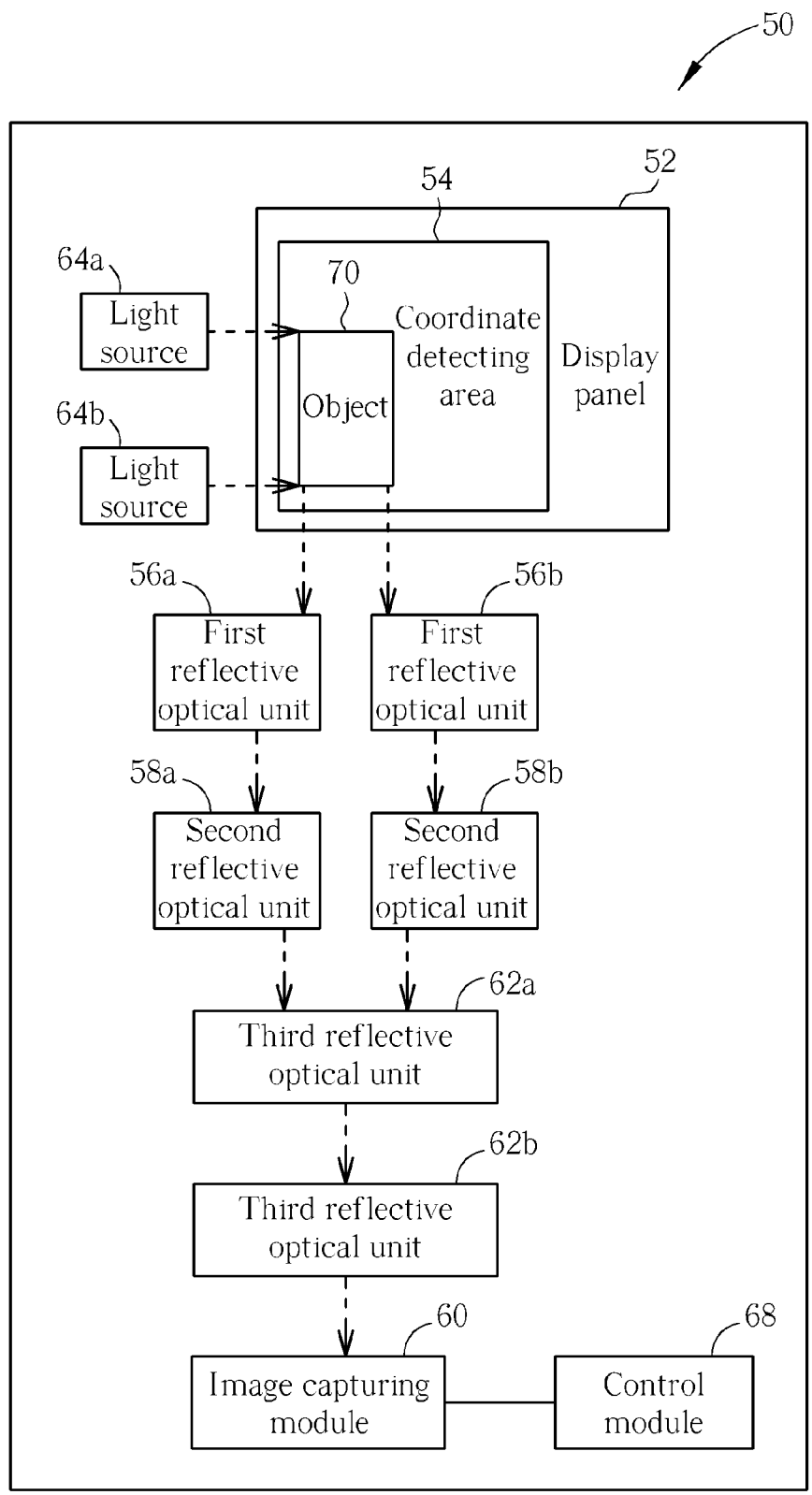
FIG. 1 is a functional block diagram of an optical imaging device according to an embodiment of the present invention.
Figure 2:
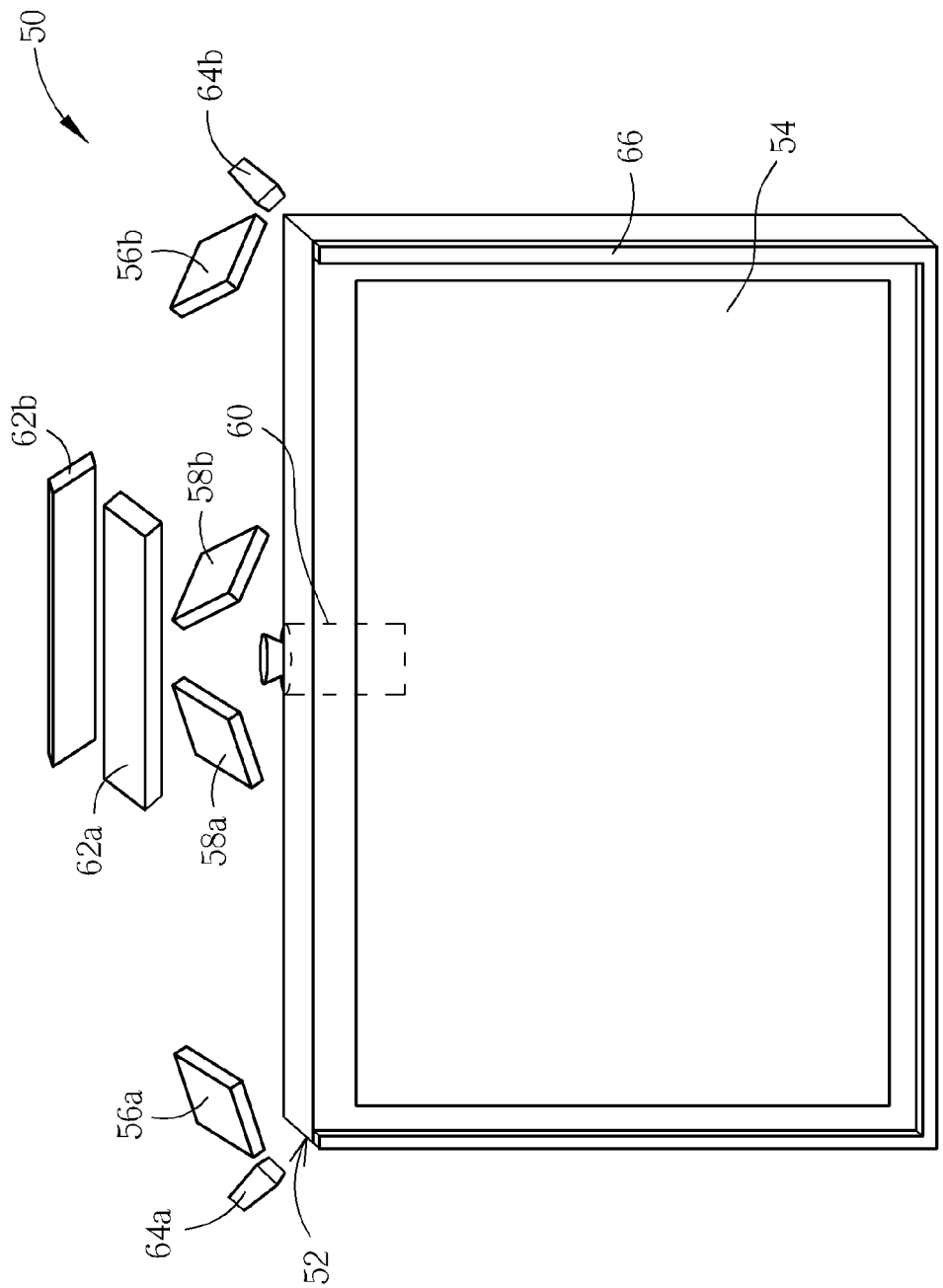
FIG. 2 is a diagram of the optical imaging device according to the embodiment of the present invention.
Figure 3:
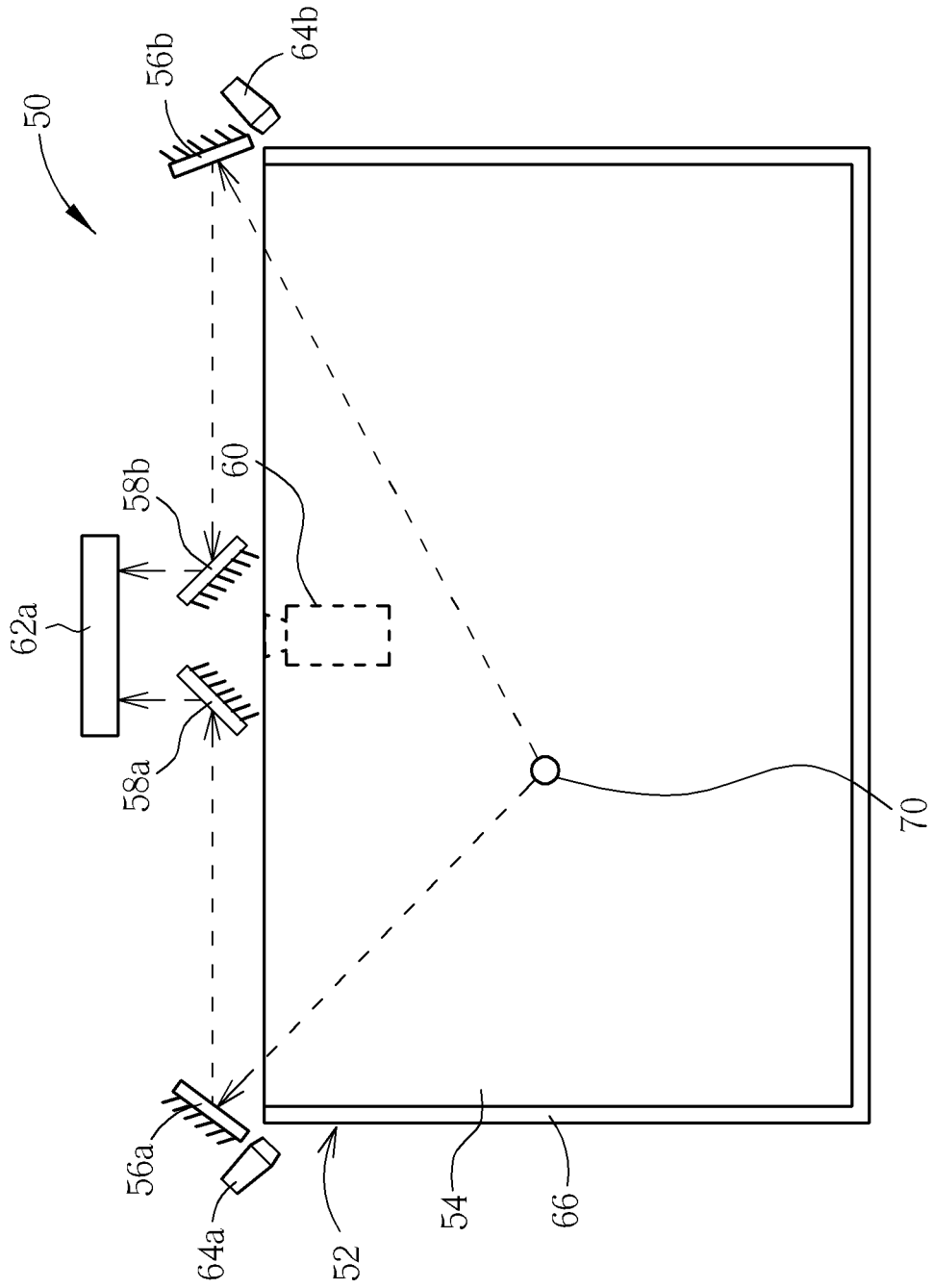
FIG. 3 is a front view of the optical imaging device according to the invention of the present invention.
Figure 4:
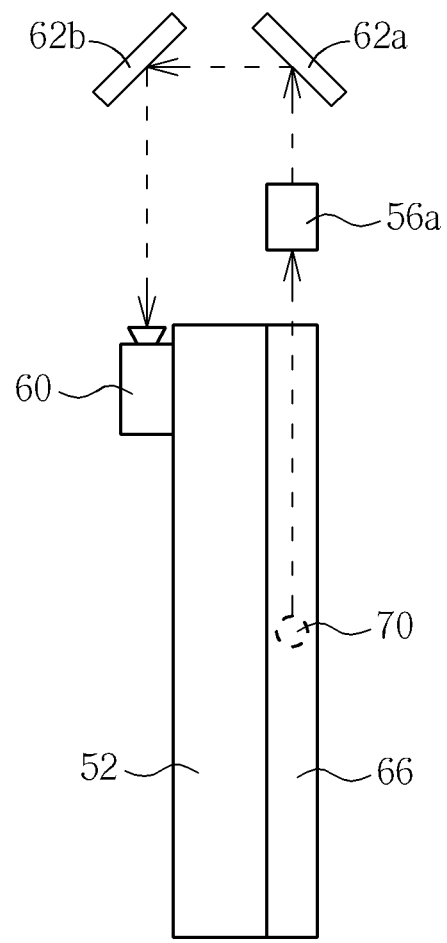
FIG. 4 is a side view of the optical imaging device according to the embodiment of the present invention.

Please refer to FIG. 1 to FIG. 4. FIG. 1 is a functional block diagram of an optical imaging device 50 according to an embodiment of the present invention. FIG. 2 is a diagram of the optical imaging device 50 according to the embodiment of the present invention. FIG. 3 is a front view of the optical imaging device 50 according to the invention of the present invention. FIG. 4 is a side view of the optical imaging device 50 according to the embodiment of the present invention. The optical imaging device 50 includes a display panel 52 whereon a coordinate detecting area 54 is formed, two first reflective optical units 56a, 56b installed on two outside corners of the display panel 52, two second reflective optical units 58a, 58b installed outside the display panel 52, an image capturing module 60 installed on a side of the display panel 52, two third reflective optical units 62a, 62b disposed on a light path between the second reflective optical unit 58 and the image capturing module 60, two light sources 64a, 64b disposed on the outside corners of the display panel 52, a non-reflective rim 66 disposed on lateral sides of the display panel 52 and a control module 68 coupled to the image capturing module 60.

The control module 68 is used for receiving at least one image datum captured by the image capturing module 60 and for calculating a coordinate value of the object 70 within the coordinate detecting area 54 according to the at least one image datum. The display panel 52, the first reflective optical units 56a, 56b, the second reflective optical units 58a, 58b, the image capturing module 60, the third reflective optical units 62a, 62b, the light sources 64a, 64b, the non-reflective rim 66 and the control module 68 of the present invention can be integrated in a single display, such as a monitor, an All In One PC, an electronic billboard or electronic white board and so on. Alternatively, the first reflective optical units 56a, 56b, the second reflective optical units 58a, 58b, the image capturing module 60, the third reflective optical units 62a, 62b, the light sources 64a, 64 and the control module 68 can be modularized separately. For example, the above-mentioned components can be disposed inside a frame hung on the display panel 52, and the coordinate detecting area 54 can be a transparent panel on the frame, so as to be installed on the different display panels 52.

In order to implement touch control on the optical imaging device 50, a user can operate touch control within the coordinate detecting area 54, such as moving fingers (the object 70) within the coordinate detecting area 54. The light sources 64a, 64b are used for emitting light to the coordinate detecting area 54, so as to illuminate the object 70. The light sources 64a, 64b can be an infrared light emitting diode, respectively. In this embodiment, the two light sources 64a, 64b are disposed on the outside corners of the display panel 52, respectively. The disposal position and amount are not limited to those mentioned in this embodiment, and it depends on practical demands. The non-reflective rim 66 is disposed on lateral sides of the display panel 52, e.g. on the three lateral sides of the display panel 52. The non-reflective rim 66 is used for providing the object 70 with an image capturing background when the object 70 is within the coordinate detecting area 54. For example, the non-reflective rim 66 can be made of non-reflective material, or alternatively, a surface of the non-reflective rim 66 can be processed with dull finish. Consequently, the image capturing position of the object 70 within the coordinate detecting area 54 can be contrasted clearly. It should be noticed that a width of the non-reflective rim 66 can be substantially equal to a width of the first reflective optical unit 56 and a width of the second reflective optical unit 58. In such a manner, it can guarantee that a width of the effective image needed to be captured equals to the width of the non-reflective rim 66. Accordingly, determining a Region of Interest (ROI) is not required.

When the object 70 is moved within the coordinate detecting area 54, the light emitted from the two light sources 64a, 64b to the object 70 (illustrated in dotted line) can be reflected by the object 70 to the two first reflective optical units 56a, 56b. Then, the light can be reflected by the two first reflective optical units 56a, 56b to the second reflective optical units 58a, 58b, and the first reflective optical units 56a, 56b and the second reflective optical units 58a, 58b can be substantially disposed in the same horizontal position. Afterwards, the second reflective optical units 58a, 58b respectively reflect the light to the third reflective optical unit 62b, wherein the second reflective optical units 58a, 58b and the third reflective optical unit 62a can be substantially disposed in the same vertical position. Then, the third reflective optical unit 62a reflects the light to the third reflective optical unit 62b, wherein the third reflective optical units 62a, 62b can be substantially disposed in the same horizontal position. Finally, the third reflective optical unit 62b reflects the light to the image capturing module 60.

Figure 5:
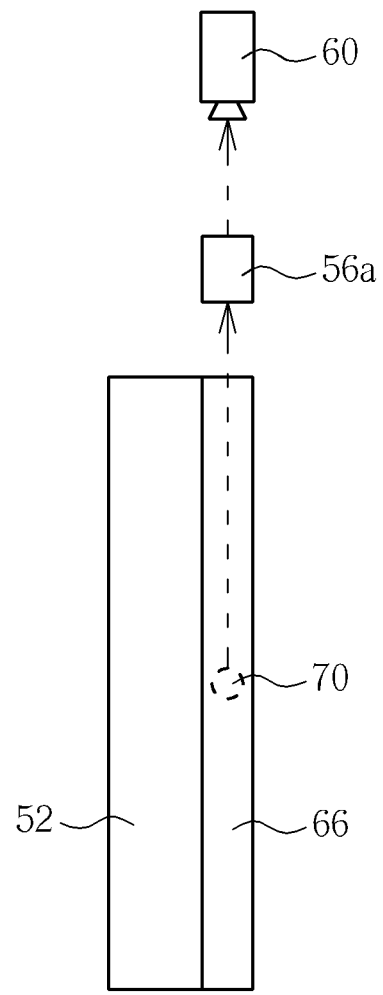
FIG. 5 is a side view of an optical imaging device according to another embodiment of the present invention.

In this embodiment, the first reflective optical units 56a, 56b, the second reflective optical units 58a, 58b and the third reflective optical units 62a, 62b are disposed above the display panel 52, and the image capturing module 60 is disposed behind the display panel 52. The first reflective optical units 56a, 56b, the second reflective optical units 58a, 58b and the third reflective optical units 62a, 62b can be respectively a planar reflective mirror or a spherical reflective mirror and so on, and the disposal positions and amounts are not limited to those mentioned in this embodiment. As long as an optical mechanism capable of guiding the light to the image capturing module 60, it belongs to the scope of the present invention. For example, please refer to FIG. 5. FIG. 5 is a side view of the optical imaging device 50 according to another embodiment of the present invention. The third reflective optical units 62*a*, 62*b* of the present invention can be omitted. In this embodiment, the image capturing module 60 can be disposed above the second reflective optical units 58*a*, 58*b*. In other words, the image capturing module 60 can be disposed instead of the third reflective optical unit 62*a* in the above-mentioned embodiment without disposing the third reflective optical units 62*a*, 62*b*. Accordingly, the image capturing module 60 can directly capture the light traveled from the second reflective optical units 58*a*, 58*b*.

After traveling a plurality of light paths, the image capturing module 60 can capture at least one image datum of the object 70. The image capturing module 60 can be an image sensor, such as a CMOS image sensor and so on. It should be noticed that a gap is formed between the two second reflective optical units 58*a*, 58*b*. Consequently, the light reflected by the object 70 located within a central area of the coordinate detecting area 54 can be reflected directly by the third reflective optical units 62*a*, 62*b* to the image capturing module 60 and travel through the first reflective optical units 56*a*, 56*b* and the second reflective optical units 58*a*, 58*b* simultaneously. In such a manner, it can avoid the issue that the layout of two image capturing modules located at two corners mentioned in the prior art might cause some area (such as the central area) to be a dead area of touch control. Furthermore, the control module 68 coupled to the image capturing module 60 is used for receiving the at least one image datum captured by the image capturing module 60 and for calculating a coordinate value of the object 70 within the coordinate detecting area 54. If the image capturing module 60 receives the lights transmitted respectively from the two first reflective optical units 56*a*, 56*b* and the second reflective optical units 58*a*, 58*b*, there are two image data for the control module 68 to calculate the coordinate value of the object 70 within the coordinate detecting area 54. For example, the control module 68 can proceed image processing for the two image data, such as diminishing noises and so on, and then proceed coordinate transformation for the image data. For example, a position of the object 70 within the coordinate detecting area 54 can be determined by utilizing the triangle orientation to calculate included angles between coordinate axes and the image. Finally, the coordinate value of the coordinate detecting area 54 can be transformed by utilizing the above-mentioned position of the object 70, and the coordinate value provides a host with reference for touch control.

Figure 6:
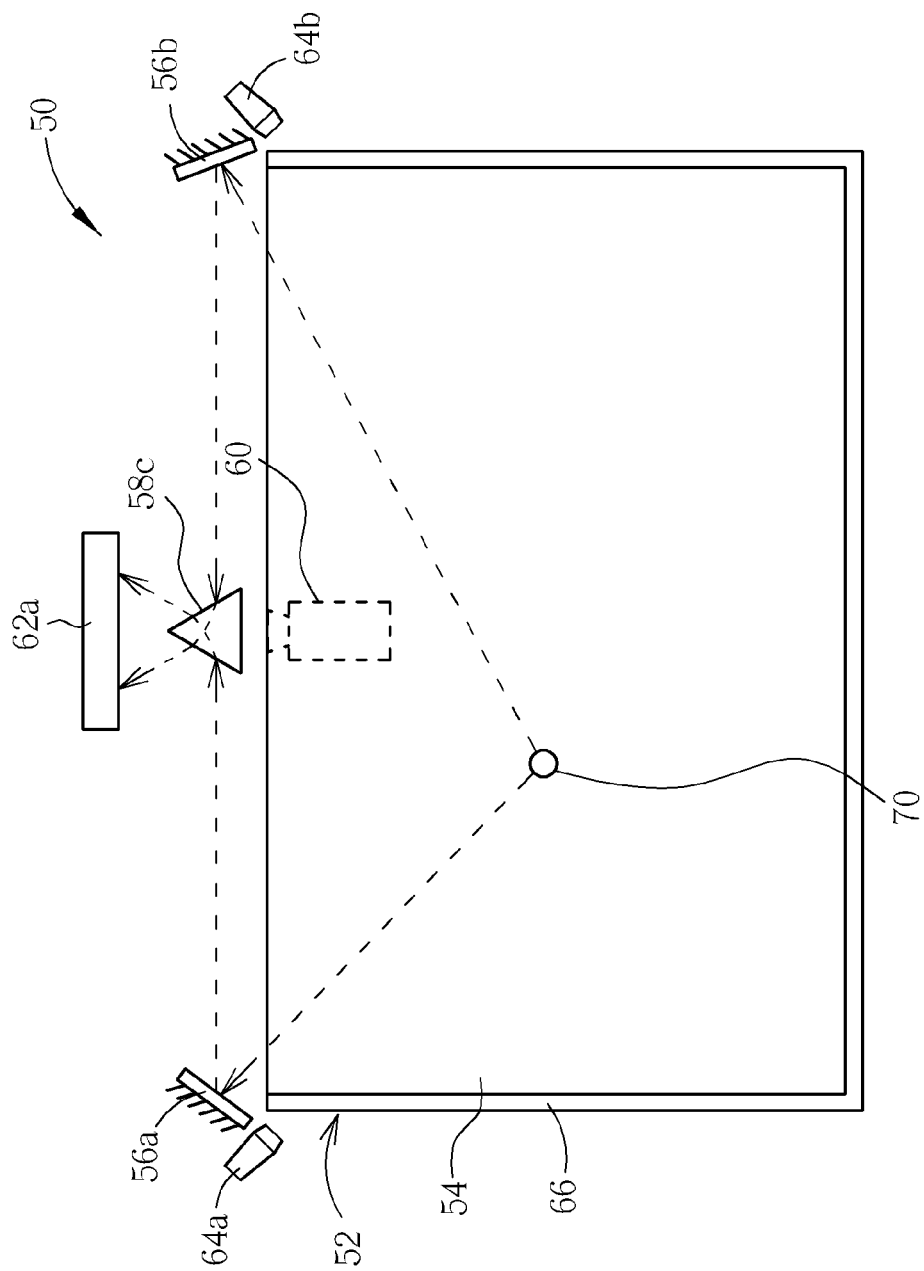
FIG. 6 is a front view of the optical imaging device according to another embodiment of the present invention.

In addition, please refer to FIG. 6. FIG. 6 is a front view of the optical imaging device 50 according to another embodiment of the present invention. The major difference between this embodiment and the aforementioned embodiment is that a second reflective optical unit 58*c* of the optical imaging device 50 is a prism, and two lateral sides of the prism are respectively used for reflecting the light transmitted from the first reflective optical units 56*a*, 56*b*. In other words, the second reflective optical unit 58*c* can be a single optical component in this embodiment, and the first reflective optical units 56*a*, 56*b* are two separate optical components in the aforementioned embodiment. As for other optical principle in this embodiment is the same as that mentioned in the aforementioned embodiment, so it is not depicted herein for simplicity.

Compared with the prior art, the optical imaging device utilizes a plurality of reflective optical units to capture image synchronously by a single image capturing module, so as to save cost and solve an issue of synchronization of capturing images. Furthermore, the present invention utilizes the plurality of reflective optical units to focus the light reflected from the object on a position where the image is captured. Consequently, it can be implemented in large-size display panel neither utilizing an image sensor with a large sensing area nor causing an image to deform. Furthermore, since none of the reflective opticals is disposed within a touch control area of the display panel, it will not cause any inconvenience for the user. The present invention provides the optical imaging device with a low cost, high stability and being capable of solving the issue of synchronization of capturing images.

Those skilled in the art will readily observe that numerous modifications and alterations of the device and method may be made while retaining the teachings of the invention.

What is claimed is:

1. An optical imaging device, comprising:
   a display panel whereon a coordinate detecting area is formed;
   at least one first reflective optical unit installed on an outside corner of the display panel for reflecting light transmitted from an object moving within the coordinate detecting area;
   at least one second reflective optical unit installed outside the display panel for reflecting the light reflected from the at least one first reflective optical unit;
   an image capturing module installed on a side of the display panel for capturing the light reflected from the at least one second reflective optical unit so as to capture at least one image of the object;
   at least one third reflective optical unit disposed on a light path between the at least one second reflective optical unit and the image capturing module, the at least one third reflective optical unit being used for reflecting the light reflected from the at least one second reflective optical unit or for reflecting the light, which is directly transmitted from the object without intervening reflection, to the image capturing module; and
   a control module coupled to the image capturing module for receiving the at least one image captured by the image capturing module and for calculating a coordinate value of the object within the coordinate area according to the at least one image.

2. The optical imaging device of claim 1, wherein the at least one first reflective optical unit comprises two first reflective optical units respectively installed on two corners of an outer side of the display panel.

3. The optical imaging device of claim 2, wherein the at least one second reflective optical unit comprises two second reflective optical units installed at a middle position of the outer side of the display panel for respectively reflecting the light reflected from the two first reflective optical units.

4. The optical imaging device of claim 3, wherein a gap is formed between the two second reflective optical units.

5. The optical imaging device of claim 2, wherein the second reflective optical unit is a prism, and two sides of the prism are used for respectively reflecting the light reflected from the two first reflective optical units.

6. The optical imaging device of claim 1, wherein the at least one third reflective optical unit comprises two third reflective optical units, and one of the two third reflective optical units is used for reflecting the light reflected from the at least one second reflective optical unit or for reflecting the light transmitted from the object to the other one third reflective optical unit, so as to make the other one third reflective optical unit reflect the light to the image capturing module.

7. The optical imaging device of claim 1, wherein the at least one first reflective optical unit, the at least one second reflective optical unit, and the at least one third reflective optical unit are disposed above the display panel, and the image capturing module is disposed behind the display panel.

8. The optical imaging device of claim 1, further comprising at least one light source disposed on the outside corner of the display panel for emitting light to the coordinate detecting area, so as to illuminate the object.

9. The optical imaging device of claim 8, wherein the at least one light source is an infrared light emitting diode.

10. The optical image device of claim 1, further comprising a non-reflective rim disposed on lateral sides of the display panel for providing the object with an image capturing background.

11. The optical image device of claim 10, wherein a width of the non-reflective rim is substantially equal to a width of the at least one first reflective optical unit and a width of the second reflective optical unit.

12. The optical image device of claim 1, wherein the at least one first reflective optical unit and the at least one second reflective optical unit are respectively a planar reflective mirror or a spherical reflective mirror.

13. The optical image device of claim 1, wherein the image capturing module is an image sensor.

* * * * *